United States Patent
Hong et al.

(10) Patent No.: US 7,682,083 B2
(45) Date of Patent: Mar. 23, 2010

(54) BEARING SYSTEM

(75) Inventors: Chu-Wan Hong, Tu-Cheng (TW);
Ching-Tai Cheng, Tu-Cheng (TW);
Tze-Yuan Wang, Tu-Cheng (TW)

(73) Assignee: Foxconn Technology Co., Ltd.,
Tu-Cheng, Taipei Hsien (TW)

( * ) Notice: Subject to any disclaimer, the term of this patent is extended or adjusted under 35 U.S.C. 154(b) by 1203 days.

(21) Appl. No.: 11/245,319

(22) Filed: Oct. 6, 2005

(65) Prior Publication Data

US 2006/0110084 A1    May 25, 2006

(30) Foreign Application Priority Data

Nov. 19, 2004    (CN) .......................... 2004 1 0052382

(51) Int. Cl.
*F16C 33/24* (2006.01)
(52) U.S. Cl. ...................................... 384/276; 384/322
(58) Field of Classification Search .................. 384/276, 384/286, 289, 290, 297, 322, 397
See application file for complete search history.

(56) References Cited

FOREIGN PATENT DOCUMENTS

JP        2003/97558        *    9/2001

* cited by examiner

*Primary Examiner*—William C Joyce
(74) *Attorney, Agent, or Firm*—Frank R. Niranjan

(57) ABSTRACT

A bearing system includes a bearing, a shaft extending in the bearing, and a layer of nano-structured coating coated on one of the bearing and the shaft. A space is formed between the bearing and the shaft, and a lubricant is filled in the space. The lubricant is made of polymer material with hydrophilic and hydropholic properties. The nano-structured coating has a high surface tension which results in the coating being capable of adsorbing the lubricant to form a layer of lubricant film between the coating and the other of the bearing and the shaft, thereby reducing possibility of direct contact between the lubricant and the other of the shaft and the bearing. Thus, loss of the lubricant is reduced to avoid contacting frication between the shaft and the bearing. Accordingly, noise generated by the bearing system is decreased and life of the bearing system is extended.

12 Claims, 2 Drawing Sheets

BEARING SYSTEM

TECHNICAL FIELD

The present invention relates to a bearing system.

BACKGROUND

Bearing systems have been widely used to pivotably connect two components of devices, such as stators and rotors of fans. Ball bearing and sleeve bearing are two typical kinds of bearings.

A ball bearing comprises an inner ball bearing race for engaging with a central rotary shaft of a rotary component of a device and an outer ball bearing race for engaging with a stationary component of the device. A plurality of balls is arranged between the inner and outer ball bearing races. This configuration allows for rotational movement of the outer ball bearing race relative to the inner ball bearing race for rotation of the rotary component without a direct surface movement between the shaft and the bearing. A low friction exists between the balls and the inner and outer ball bearing races so that the rotary component can rotate smoothly relative to the stationary component. However, the ball bearing has a low load bearing capacity since balls contact with inner and outer ball bearing races in a point-to-point manner. Furthermore, the ball bearing has many components, i.e., the inner ball bearing race, the outer ball bearing race and a plurality of balls, which increases the cost thereof.

A sleeve bearing employs a bearing which directly and movably contacts with a rotary shaft. Lubricant is filled in a space formed between the bearing and the shaft for reducing friction therebetween. The sleeve bearing has a high load bearing capacity since the bearing contacts with the rotary shaft in a surface-to-surface manner and low cost since it employs only a bearing body. However, in working of the sleeve bearing, the lubricant is gradually lost which results in high friction being generated between the rotary shaft and the bearing and noise being generated accordingly. Furthermore, high friction between the shaft and the bearing can reduce the lift of the sleeve bearing.

For the foregoing reasons, therefore, there is a need in the art for a bearing system which overcomes the above-mentioned problems.

SUMMARY

A bearing system comprises a bearing with a hole defined therein and an inner surface surrounding the hole, a shaft having an outer surface and extending in the hole of the bearing, and a layer of nano-structured coating coated on one of the inner surface of the bearing and the outer surface of the shaft. A space is formed between the inner surface of the bearing and the outer surface of the shaft, and a lubricant is filled in the space. The lubricant is made of polymer material with hydrophilic and hydropholic properties. The nano-structured coating has a high surface tension, which results in the coating having good hydrophilic and adsorptive property. The coating is capable of adsorbing the lubricant to cause the lubricant to locate adhered to the coating and away from the other of the inner surface of the bearing and the outer surface of the shaft. A gap is therefore formed between the lubricant and the other of the inner surface of the bearing and the outer surface of the shaft, which reduces possibility of direct contact between the lubricant and the other of the inner surface of the bearing and the outer surface of the shaft. Thus, loss of the lubricant is decreased to avoid contacting friction between the shaft and the bearing. Accordingly, noise generated by the bearing system is decreased and life of the bearing system is extended.

Other objects, advantages and novel features of the present invention will be drawn from the following detailed description of a preferred embodiment of the present invention with attached drawings, in which:

DETAILED DESCRIPTION OF PREFERRED EMBODIMENTS

Figure 1:
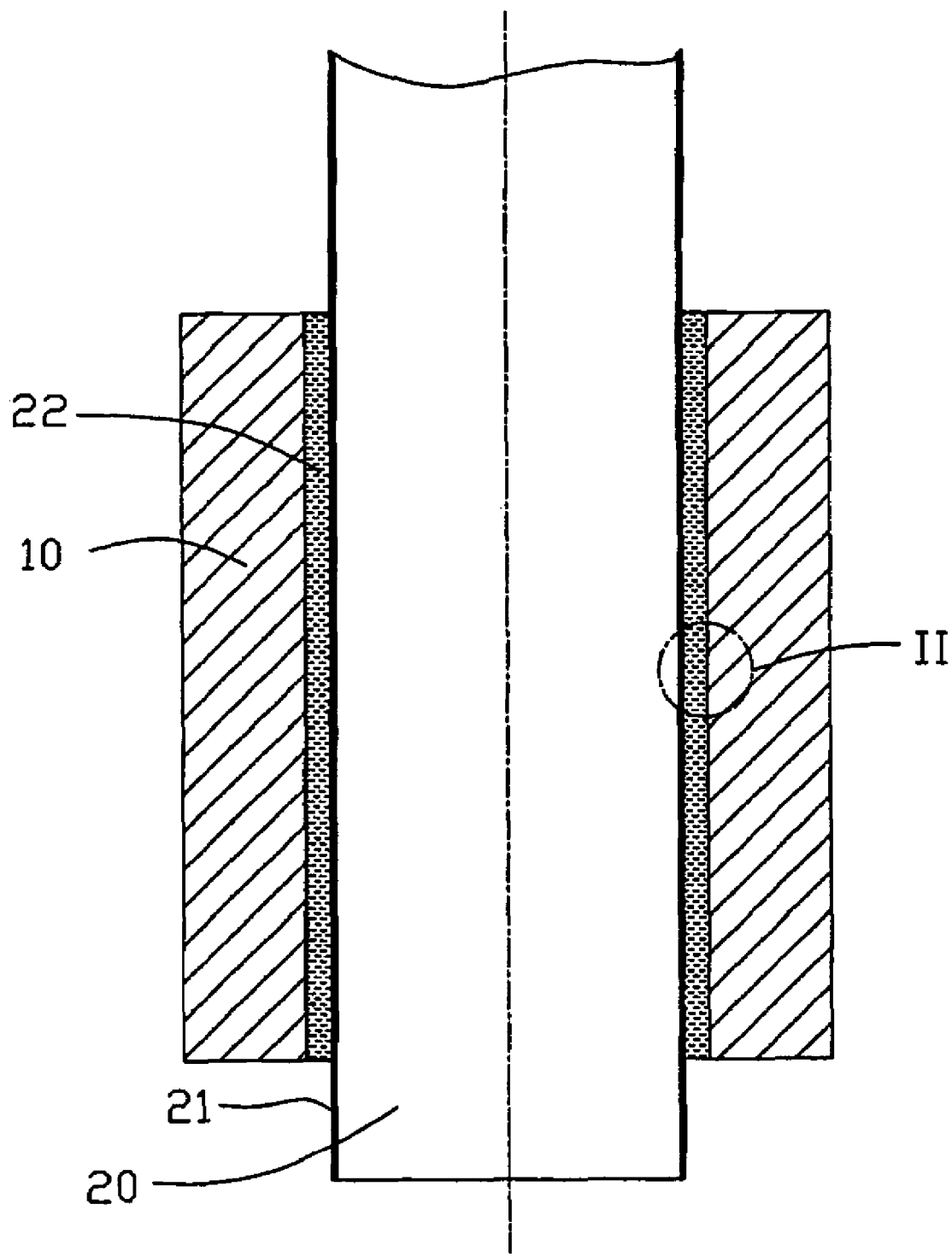
FIG. 1 is a cross section view of a bearing system in accordance with a preferred embodiment of the present invention.
Figure 2:
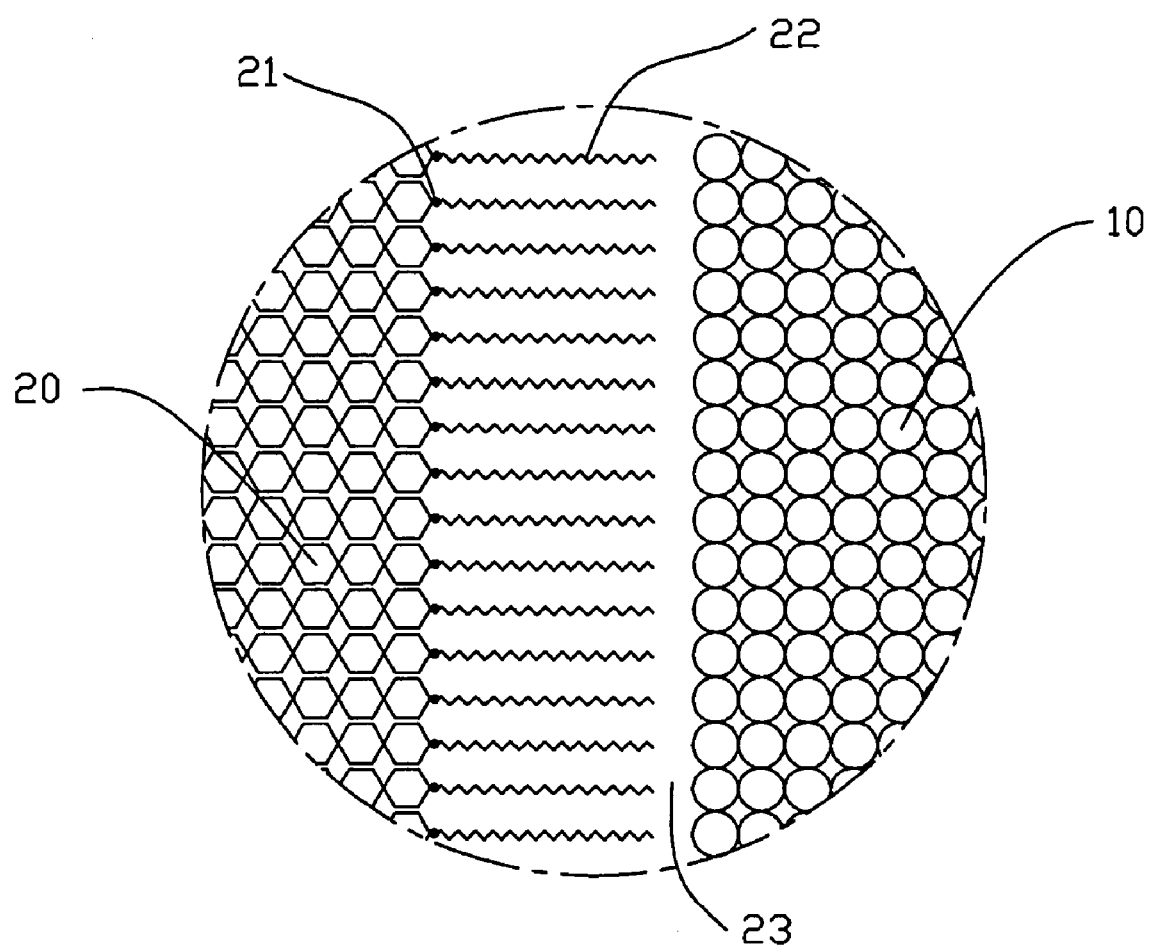
FIG. 2 is an enlarged view of an encircled portion II of FIG. 1.

FIGS. 1-2 show a bearing system in accordance with a first embodiment of the present invention. The bearing system comprises a bearing 10 and a shaft 20 extending through the bearing 10 with a space formed therebetween. Lubricant 22 is filled within the space formed between the bearing 10 and the shaft 20.

The bearing 10 is made of material with high rigidity, such as ceramic, metal alloy and so on. An inner surface of the bearing 10 may be treated, such as by coating a layer of hydrophilic film thereon, to increase hydrophilic property of the bearing 10.

The shaft 20 may be made of metal material, such as stainless steel. A layer of nano-structured coating 21 is coated on an outer surface of the shaft 20. The coating 21 may be made of TiN, DLC, TiAlN, TiCN, CrN, WC and so on. The coating 21 has high surface tension.

The lubricant 22 is made of polymer material with a hydrophilic functional group with hydrophilic property and a hydrophobic functional group with hydrophobic property, such as perfluorinated polyether (PFPE).

In the preferred embodiment described above, the shaft 20 is coated with the nano-structured coating 21 which increases the surface hardness and decreases the friction coefficient of the shaft 20. Furthermore, the nano-structured coating 21 has high surface tension, which results in the coating 21 having good hydrophilic and adsorptive property. Thus, the coating 21 coated on the shaft 20 is capable of adsorbing the lubricant 22 to form a layer of lubricant film firmly attached around the coating 21. The hydrophilic functional group of the lubricant 22 is adsorbed to be adjacent and adhere to the coating 21 while the hydrophobic functional group of the lubricant 22 is repulsed away from the coating 21. The bearing 10 repulses the lubricant 22 since the inner surface of the bearing 10 is hydrophilic. A gap 23 is therefore formed between the lubricant 22 and the inner surface of the bearing 10, as shown in FIG. 2. Thus, a possibility of direct contact between the lubricant 22 and the inner surface of the bearing 10 is decreased. Loss of the lubricant 22 generated due to friction between the lubricant 22 and the inner surface of the bearing 10 is therefore decreased, thereby avoiding contact friction between the shaft 20 and the bearing 10. Accordingly, noise generated by the bearing system is decreased and life of the bearing system is extended.

Alternatively, the nano-structured coating 21 may be coated on the inner surface of the bearing 10 and the outer surface of the shaft 20 is treated to increase hydrophilic property thereof.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A bearing system comprising:
   a bearing with a hole defined therein and an inner surface surrounding the hole;
   a shaft with an outer surface, the shaft extending in the hole of the bearing with a space formed between the inner surface of the bearing and the outer surface of the shaft;
   lubricant being filled in the space; and
   a layer of nano-structured coating being coated on one of the inner surface of the bearing and the outer surface of the shaft for adsorbing the lubricant to form a layer of lubricant film between the coating and the other of the inner surface of the bearing and the outer surface of the shaft;
   wherein the lubricant is made of polymer material with a hydrophilic functional group and a hydropholic functional group, the hydrophilic functional group being adsorbed adhere to the coating and the hydrophobic functional group being repulsed away from the coating; and
   wherein the polymer material is perfluorinated polyether.

2. The bearing system as claimed in claim 1, wherein the coating is made of one of TiN, DLC, TiAlN, TiCN, CrN and WC.

3. The bearing system as claimed in claim 1, wherein said the other of the inner surface of the bearing and the outer surface of the shaft is hydrophilic for repulsing the lubricant to form a gap between the lubricant and said the other of the inner surface of the bearing and the outer surface of the shaft.

4. The bearing system as claimed in claim 3, wherein said the other of the inner surface of the bearing and the outer surface of the shaft is treated by coating a layer of hydrophilic film thereon.

5. A bearing system comprising:
   a bearing defining an inner surface;
   a shaft defining an outer surface rotatably received in the inner surface of the bearing, wherein one of the inner surface and the outer surface being coated with a nano-structured coating having good hydrophilic property, the other of the inner surface and the outer surface being coated with a hydrophilic film; and
   lubricant being filled between the outer surface and the inner surface, the lubricant comprising a polymer material with a hydrophilic functional group having hydrophilic property and a hydrophobic functional group having hydrophobic property;
   wherein the nano-structured coating is made of one of TiN, DLC, TiAlN, TiCN, CrN and WC.

6. The bearing system of claim 5, wherein the lubricant is made of perfluorinated polyether (PFPE).

7. The bearing system of claim 6, wherein a gap is defined between the lubricant and the other of the inner surface and outer surface.

8. The bearing system of claim 5, wherein a gap is defined between the lubricant and the other of the inner surface and the outer surface.

9. A bearing system comprising:
   a bearing;
   a shaft rotatably received in the bearing, the bearing and shaft being coated with hydrophilic coatings, respectively; and
   lubricant filled between the coatings, the lubricant being made of polymer material comprising a hydrophilic group and a hydrophobic group;
   wherein one of the coatings has a nano-structure; and
   wherein the lubricant is made of perfluorinated polyether.

10. The bearing system of claim 9, wherein said one of the coatings is made of one of TiN, DLC, TiAlN, TiCN, CrN and WC.

11. The bearing system of claim 10, wherein a gap is formed between the lubricant and the other of the coatings.

12. The bearing system of claim 9, wherein a gap is formed between the lubricant and the other of the coatings.

* * * * *